July 7, 1931.  J. P. BUNCE  1,813,794
CONVEYER SYSTEM
Filed Aug. 18, 1927   2 Sheets-Sheet 1
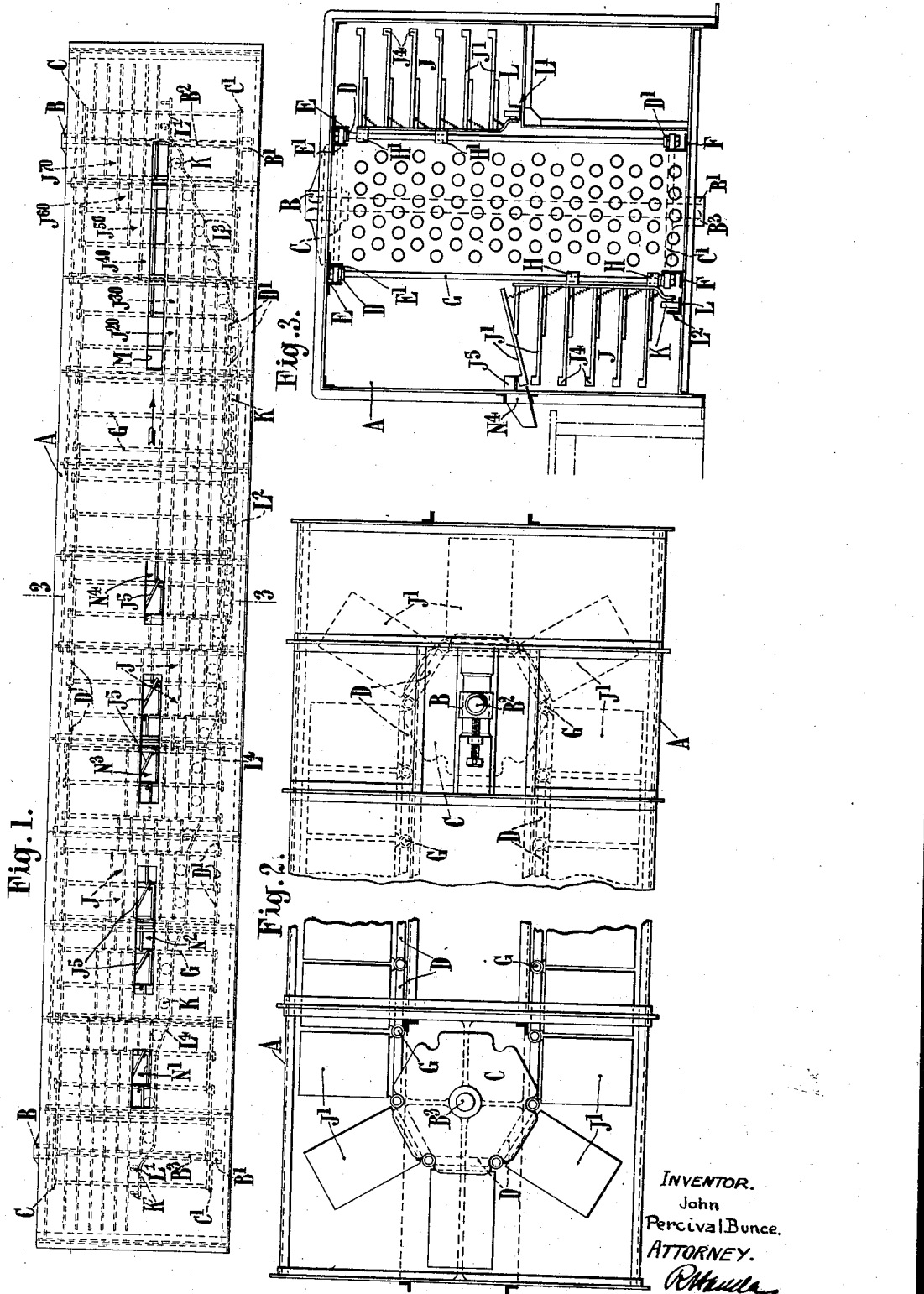
INVENTOR.
John Percival Bunce.
ATTORNEY.

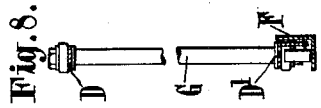
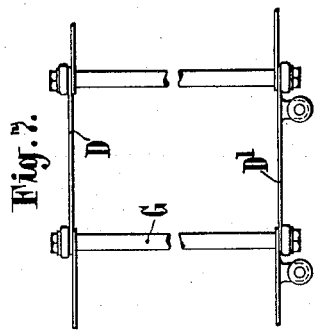
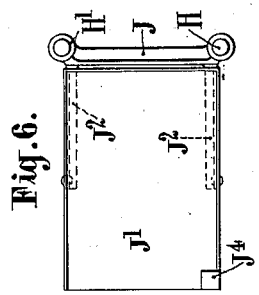
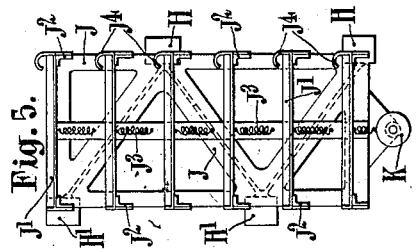
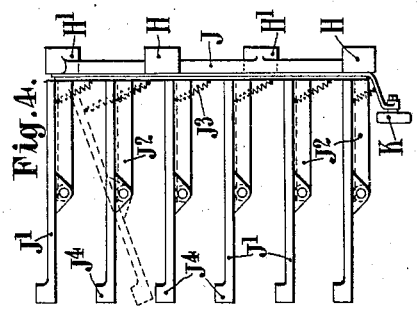

Patented July 7, 1931

1,813,794

UNITED STATES PATENT OFFICE

JOHN PERCIVAL BUNCE, OF LONDON, ENGLAND, ASSIGNOR TO BAKER PERKINS CO. INC., OF SAGINAW, MICHIGAN, A CORPORATION OF NEW YORK

CONVEYER SYSTEM

Application filed August 18, 1927, Serial No. 213,911, and in Great Britain September 8, 1926.

This invention relates to conveyer systems, for example of the endless type, and more particularly of the kind which embodies a plurality of travelling supporting members for the goods to be conveyed, which members are adapted to be associated with means located in a fixed plane or planes and either automatic or manual or partly automatic and partly manual for depositing the goods on said supports to receive a certain treatment, such as cooling, and for removing them therefrom after such treatment.

The invention has been particularly designed for cooling confections such as chocolates after being coated, moulded or otherwise produced, but is capable of general use where applicable, amongst which other applications may be mentioned the proving of dough in bread making.

The object of the invention is to provide a conveyer system of great capacity in a limited space by forming the conveyer of a sequence of elements each comprising a series of superposed supports for the goods, and so operating the conveyer that these supports can be brought in a given sequence into a given plane or planes, such plane or planes being that or those in which the goods are delivered to the conveyer, and again, also, if required, into a plane or planes where the goods are to be removed therefrom. In a practical embodiment of the invention particularly suitable for the purpose above stated, viz. the cooling of confectionery, the conveyer comprises two vertically spaced endless chains or equivalents passing at opposite loops about guiding sprockets, pulleys or the like, one or both of which may constitute driving means. The said chains support between them a number of spaced vertical rods or guides on which are mounted for sliding movement racks, frames or the like each carrying or comprising a number of superposed supports or trays for the goods which may be either in moulds or otherwise. At or near one end of the charging position the uppermost or lowermost of said trays is in the same plane as a moving band or web or fixed table or other device by or from which the goods may be fed to the conveyer, but as the latter carries out its translational movement the next tray of the same element is caused in turn to reach the said feeding plane by the rack sliding vertically on the rods aforesaid; this is then repeated and the third and following trays are successively brought to the feeding plane until all the trays are filled, each tray reaching the level of the feeding plane at a successive position along the latter in the direction of the translational movement of the conveyer.

It will be obvious that as the elements follow one another without interval, a plurality of trays, one in each element, simultaneously reach the feeding plane, but that the tray in each element is a step above or below, as the case may be, that in the next adjoining element.

The converse of this operation will also occur at the discharging plane.

This sliding movement of the racks is preferably effected or permitted by the provision of a suitable number of stationary cam tracks rising or falling in step formation, there being as many steps as there are trays pertaining to each sliding rack or element, and on which tracks rollers on the bases of the racks are adapted to ride to produce the desired movements. Obviously the movement of the trays or supports may be either upwards or downwards after feeding the goods thereto according to the relative planes of the conveyer and feeding means, and the reverse for delivery or discharge of the goods from the trays. The construction described also permits the system to be operated continuously at substantially full capacity all the time by suitably disposing the feeding and discharging positions.

According to the purpose to which the invention is being applied, the conveyer, as to the whole or part of its course, may be caused to traverse one or more cooling, tempering or other chambers, tunnels or the like and means may also be provided for conveying away the treated goods and if necessary emptied moulds to be dried and moved to a position for recharging adjacent the feeding position or otherwise.

The accompanying drawings illustrate a conveyer of this type arranged for operation in a chamber which may be a cooling chamber. Fig. 1 is a side elevation. Fig. 2 a broken plan view on a larger scale, part with the cover removed. Fig. 3 is a cross section on line 3—3 of Fig. 1. Fig. 4 is an end elevation, and Fig. 5 a front elevation of one of the tray racks. Fig. 6 is a plan view thereof. Figs. 7 and 8 are detail views of part of the conveyer chains and of the track therefor.

A is a chamber having near its ends bearings B, B¹ for shafts B², B³ and carrying sprocket wheels C, C¹ about which the chains D, D¹ pass, these chains lying and moving in horizontal planes one above and the other below in the chamber A and guided by suitable rails E, E¹ and F. The chains D, D¹ are connected to one another at intervals by vertical rods G which may suitably form the pivots connecting the chain links together. On these rods slide sleeves H, H¹ to which racks J are secured. Each rack J is thus carried by two adjacent rods G and the sleeves H, H¹ are so disposed at different heights as to permit of a limited independence in the rising and falling movements of each rack as regards its neighbour on each side. The racks J are supported on wheels K running on a track L. Each rack J carries a plurality of trays J¹ one above another at a proper interval. This track L is brought to different levels at different parts of the chamber A, having a main upper level L¹, a main lower level L², a step up portion L³ from the lower level L² to the upper level L¹ and a step down portion L⁴ from the upper to the lower level. In the side wall of the chamber A are two longitudinal openings or sets of openings at a convenient height from the ground. M is the filling opening, the other forms the emptying or discharge opening or openings. These openings are located in reference to the step up portion L³ and step down portion L⁴ of the track in such a manner that the trays are successively brought to the level of said openings in the manner hereinbefore described. Thus as illustrated in Fig. 1, one of the racks marked J²⁰ is shown as having its top tray level with the filling opening and in position to receive goods passed through said opening. At the same time the second tray of the rack J³⁰ on the right of rack J²⁰ is similarly level with the filling opening, as is also the third tray of the next rack J⁴⁰ to the right and so on as far as rack J⁷⁰ of which the bottom tray is level with the filling opening. As the conveyer moves in the direction of the arrow, the racks J²⁰—J⁷⁰ move therewith and also rise each a distance equal to the space between the trays; thus the trays next below those previously filled can now be filled and also the top tray on the next rack to the left which has now reached the filling opening. Thus with the example illustrated, six trays may be loaded at each filling step, one tray in each of six successive racks. The filled racks pass along the upper run of the track and in due course arrive at the discharging station where they descend step fashion. In the example illustrated the discharging station has been divided into four substations N¹—N⁴ and the track is so stepped that the racks descend in pairs, thus affording a considerably longer time for facilitating the operation of discharging.

The trays J¹ are preferably pivoted on arms J² carried by the racks as shown in Fig. 4 so that each tray may be tilted downwards for facilitating the charging or discharging. Springs J³ normally hold the trays horizontal.

On the front of each tray at one side thereof is a lug J⁴ and adjacent the discharge openings N¹—N⁴ there are descending ramps J⁵ so placed that each tray that is to be discharged is tilted downwards as it arrives at its proper discharging station by contact of the lug J⁴ thereon with the ramp J⁵ corresponding to that station. The goods, or the mould carrying the goods, thus slide off the tray through the discharge orifice onto any suitable receiver such as an endless conveyer belt outside the apparatus.

It will be understood that the shape of the chamber A as oblong is not essential; it may have any appropriate shape in plan. In that part of the chamber where the racks are passing from the filling station to the discharging station there may be any appropriate apparatus for cooling, heating or otherwise acting on the goods according to the treatment they are intended to receive.

What I claim as my invention and desire to secure by Letters Patent of the United States is:—

1. A conveyer system comprising in combination an endless connected series of receiving devices each containing a plurality of superposed receiving compartments, means for connecting said series adapted to permit of independent movements of the several receiving devices, said movements having a component perpendicular to the general line of travel of said connected series, and means for giving travel movement to the series; together with a casing having a plurality of receiving and discharging openings parallel to the direction of travel movement, and a track in said chamber adapted to position the compartments of said receiving devices severally with respect to said openings.

2. A conveyer system comprising in combination an endless connected series of receiving devices each containing a plurality of superposed receiving compartments, means for connecting said series adapted to permit of independent rising and falling movements of the several receiving devices, a casing for said series having a plurality of receiving and discharging openings parallel to the direction of travel movement, means for supporting said connecting means in said casing, means for giving travel movement to the series, and means for positioning the compartments of the receiving devices severally with respect to said openings during the travel of said devices.

3. A conveyer system comprising in combination an endless connected series of receiving devices each containing a plurality of superposed receiving compartments, means for connecting said series adapted to permit of independent rising and falling movements of the several receiving devices, a casing for said series, means for supporting said connecting means in said casing, means for giving travel movement to the series, the said casing having a plurality of receiving and discharging openings parallel to the direction of travel movement, and a track in said chamber adapted to position the compartments of the receiving devices severally with respect to said openings during the travel of said devices.

4. A conveyer system comprising in combination an endless connected series of receiving devices each containing a plurality of superposed receiving compartments constituted by tiltable trays, means for connecting said series adapted to permit of independent rising and falling movements of the several receiving devices, a casing for said series, means for supporting said connecting means in said casing, means for giving travel movement to the series, the said casing having a plurality of receiving and discharging openings parallel to the direction of travel movement, a track in said chamber adapted to position the compartments of the receiving devices severally with respect to said openings during the travel of said devices, and means for tilting each tray when brought adjacent to its corresponding discharge opening.

5. A conveyer system comprising in combination an endless connected series of receiving devices each containing a plurality of superposed receiving compartments constituted by tiltable trays, means for connecting said series adapted to permit of independent rising and falling movements of the several receiving devices, a casing for said series, means for supporting said connecting means in said casing, means for giving travel movement to the series, the said casing having a plurality of receiving and discharging openings parallel to the direction of travel movement, a track in said chamber adapted to position the compartments of said receiving devices severally with respect to said openings, means for tilting each tray when brought adjacent to its corresponding discharge opening, and means for receiving the discharged goods from said tray.

6. A conveyer system comprising in combination a spaced pair of parallel, horizontal chains, vertical rods connecting said chains and movable with them, racks slidable bodily on said rods, said racks jointly constituting and endless connected series of receiving devices each containing a plurality of superposed receiving compartments, means for giving travel movement to the series, and a track adapted to position the compartments of said receiving devices severally in a direction normal to the line of travel.

7. A conveyer system comprising in combination a spaced pair of parallel chains rods carried by said chains, racks slidably mounted on said rods, trays pivoted on said racks, the said racks jointly constituting an endless connected series of receiving devices each containing a plurality of superposed receiving compartments, a casing for said series, means for supporting said chains in said casing, means for giving travel movement to the series, the said casing having a plurality of receiving and discharging openings parallel to the direction of travel movement, a track in said chamber adapted to position the compartments of said receiving devices severally and consecutively with respect to said openings, and means for tilting the trays adjacent to their corresponding discharge openings.

8. A conveyer system comprising in combination a spaced pair of parallel chains, rods carried by said chains, racks slidably mounted on said rods, trays pivoted on said racks, the said racks jointly constituting an endless connected series of receiving devices each containing a plurality of superposed receiving compartments, a casing for said series, means for supporting said chains in said casing, means for giving travel movement to the series, the said casing having a plurality of receiving and discharging openings parallel to the direction of travel movement, a track in said chamber adapted to position the compartments of said receiving devices severally and consecutively with respect to said openings, means for tilting the trays adjacent to their corresponding discharge openings, and means for returning said trays to their former position after tilting.

9. A conveyer system comprising in combination a spaced pair of parallel, horizontal chains, vertical rods connecting said chains and movable with them, a plurality of closely-adjacent racks carried by said rods, each rack slidably mounted on two successive rods and each rod serving as a common guide for two successive racks, said racks jointly constituting an endless series of receiving devices each containing a plurality of superposed receiving compartments, means for giving travel movement to the series, and means for bringing the compartments of said receiving devices severally and consecutively to a prede- 10. A conveyer system comprising in combination an endless connected series of closely-adjacent receiving devices each containing a plurality of superposed receiving compartments, means for giving inclined travel movement to the series, and means for bringing all the compartments of all said receiving devices severally and consecutively to a single predetermined level during their inclined travel in each direction for charging and discharging them.

11. A conveyer system comprising in combination a spaced pair of parallel, horizontal chains, vertical rods connecting said chains and movable with them, a plurality of closely-adjacent racks carried by said rods, each rack slidably mounted on two successive rods and each rod serving as a common guide for two successive racks, said racks jointly constituting an endless series of receiving devices each containing a plurality of superposed receiving compartments, means for giving travel movement to the series, and means for effecting independent rising and falling movements of the several receiving devices during their travel.

12. A conveyer system comprising in combination an endless connected series of closely-adjacent receiving devices each containing a plurality of superposed receiving compartments, pairs of vertical rods whereon the receiving devices are mounted for sliding movement, each rod serving as a common guide for two adjacent receiving devices, means for giving travel movements to the series, and means for bringing the compartments of said receiving devices severally and consecutively to a predetermined level during their travel for charging and discharging them.

13. A conveyer system comprising in combination a connected series of receiving devices each containing a plurality of superposed receiving compartments, means for giving inclined travel movement to the series, and means for bringing all the compartments of all said receiving devices severally and consecutively to a single predetermined charging level and to a single predetermined discharging level during their inclined travel.

14. A conveyer system comprising in combination a connected series of receiving devices each containing a plurality of superposed receiving compartments, means for giving inclined travel movement to the series, means for bringing the compartments of said receiving devices severally and consecutively to a predetermined charging level and to a predetermined discharging level during their inclined travel, and means for maintaining said compartments in their relative superposed position during their movements to such levels.

15. A conveyer system comprising in combination an endless connected series of closely-adjacent receiving devices each containing a plurality of superposed receiving compartments, means for giving inclined travel movement to the series, means for bringing the compartments of said receiving devices severally and consecutively to a predetermined level during their inclined travel for charging and discharging them, and means for maintaining the relative superposed position of said compartments during their movements to and from such level.

In witness whereof I have signed this specification.

JOHN PERCIVAL BUNCE.